(12) United States Patent
Haesloop

(10) Patent No.: US 8,202,185 B2
(45) Date of Patent: Jun. 19, 2012

(54) RANDOM ELASTOMER CUSHION RINGS FOR A CHAIN SPROCKET

(75) Inventor: J. Christian Haesloop, Ithaca, NY (US)

(73) Assignee: BorgWarner Inc., Auburn Hills, MI (US)

( * ) Notice: Subject to any disclaimer, the term of this patent is extended or adjusted under 35 U.S.C. 154(b) by 690 days.

(21) Appl. No.: 12/351,052

(22) Filed: Jan. 9, 2009

(65) Prior Publication Data

US 2009/0118047 A1 May 7, 2009

Related U.S. Application Data

(63) Continuation-in-part of application No. 10/959,738, filed on Oct. 6, 2004, now abandoned.

(51) Int. Cl.
*F16H 55/06* (2006.01)
*F16H 55/48* (2006.01)

(52) U.S. Cl. .......... 474/161; 474/156; 474/191

(58) Field of Classification Search .......... 474/152–156, 474/161, 190, 191
See application file for complete search history.

(56) References Cited

U.S. PATENT DOCUMENTS

| | | | |
|---|---|---|---|
| 3,057,219 A | 10/1962 | Montgomery | |
| 3,164,417 A | 1/1965 | Howes | |
| 4,022,072 A | 5/1977 | Chagawa et al. | |
| 5,980,408 A | 11/1999 | Schulz | |
| 5,984,817 A | 11/1999 | Schulz | |
| 6,090,003 A | 7/2000 | Young | |
| 6,155,943 A | 12/2000 | Ledvina et al. | |
| 6,179,741 B1 | 1/2001 | Young | |
| 6,213,905 B1 | 4/2001 | White et al. | |
| 6,371,875 B2 | 4/2002 | Young | |
| 6,652,402 B2 | 11/2003 | Poiret et al. | |
| 6,656,072 B2 | 12/2003 | Sugita et al. | |
| 7,074,147 B2 | 7/2006 | Young | |
| 7,094,170 B2 * | 8/2006 | Young | 474/161 |
| 7,371,200 B2 | 5/2008 | Young | |
| 2001/0000171 A1 | 4/2001 | Young | |
| 2002/0169044 A1 | 11/2002 | Young | |

(Continued)

FOREIGN PATENT DOCUMENTS

| | | |
|---|---|---|
| DE | 1086957 | 6/1954 |
| DE | 19929667 C1 | 1/2001 |

(Continued)

OTHER PUBLICATIONS

"PCT International Search Report" for PCT/US2010/020072, dated Aug. 13, 2010, 8 pages.

*Primary Examiner* — Bradley King
*Assistant Examiner* — Thomas Irvin
(74) *Attorney, Agent, or Firm* — Brown & Michaels, PC

(57) ABSTRACT

A sprocket includes a plurality of teeth spaced about its periphery, roots located between pairs of adjacent teeth, and a cushion ring contacted by a chain engaging the sprocket teeth. The roots have root radii defined as the distance between the center of sprocket and the point along the root closest to the sprocket center in the radial direction. In some embodiments, the roots have three distinct radii. The cushioning material of the cushion ring receives the impact while engaging the chain. In some embodiments, the cushion ring has a contour substantially following the contours of the sprocket teeth geometry. In some embodiments, the cushion ring has a randomized contour to provide predetermined cushioning that varies from tooth to tooth around the sprocket.

6 Claims, 10 Drawing Sheets

| U.S. PATENT DOCUMENTS | | | | FOREIGN PATENT DOCUMENTS | | |
|---|---|---|---|---|---|---|
| 2002/0183150 A1 | 12/2002 | Poiret | | FR | 1186486 | 8/1959 |
| 2003/0087714 A1 | 5/2003 | Todd | | JP | 57173649 | 10/1982 |
| 2003/0176251 A1 | 9/2003 | Hamilton | | JP | 57190160 | 11/1982 |
| 2003/0228950 A1 | 12/2003 | Young | | JP | 63214566 | 9/1988 |
| 2004/0185977 A1 | 9/2004 | Young et al. | | JP | 112312 | 1/1999 |
| 2004/0204274 A1 | 10/2004 | Young | | KR | 1020060062511 A | 6/2006 |
| 2006/0252592 A1 | 11/2006 | Young | | WO | 03089814 A1 | 10/2003 |
| 2009/0093329 A1* | 4/2009 | Markley et al. ............... 474/161 | | * cited by examiner | | |

RANDOM ELASTOMER CUSHION RINGS FOR A CHAIN SPROCKET

REFERENCE TO RELATED APPLICATIONS

This is a continuation-in-part patent application of co-pending application Ser. No. 10/959,738, filed Oct. 6, 2004, entitled "ELASTOMER CUSHION RING FOR A RANDOM TOOTH ROLLER CHAIN SPROCKET". The aforementioned application is hereby incorporated herein by reference.

BACKGROUND OF THE INVENTION

1. Field of the Invention

The invention pertains to the field of cushion rings. More particularly, the invention pertains to elastomer cushion rings that are bonded to at least one side of a sprocket.

2. Description of Related Art

Randomized sprockets for roller chains are known. U.S. Pat. No. 6,155,943, which is hereby incorporated herein by reference, discloses a roller chain and sprocket drive with a randomized sprocket which modulates the roller position on the sprocket by varying the radial seating position of the roller while maintaining a constant chordal dimension between seated rollers. The roots between teeth of the sprocket have radii that vary between a nominal radius, a maximum radius, and a minimum radius. This variation or randomization is intended to provide a noise modulation effect while avoiding the negative effects of high impact from conventional randomized sprockets.

Roller chain sprockets oriented to minimize strand length variation of the chain are also known. U.S. Pat. No. 6,213,905, which is hereby incorporated herein by reference, discloses a roller chain and sprocket drive which has at least two sprockets with varied radial seating positions. The relative orientations of the sprockets are adjusted to provide favorable dynamics to the drive. This includes minimizing strand variation and providing the maximum strand variation for each chain strand to be phased differently than other strands.

Elastomer cushion rings are also known for conventional sprockets with equally spaced teeth. U.S. Patent Application Publication No. 2003/0176251 discloses a method of installing a cushion ring on a sprocket body that includes applying a force to the cushion ring so that an opening in the cushion ring is deformed to a shape that accommodates passage of a non-circular flange of the sprocket body through the cushion ring. After the non-circular flange of the sprocket body is inserted through the opening of the cushion ring, the deforming force is released from the cushion ring so that the cushion ring is trapped between the flange and another portion of the sprocket body. The sprocket assembly includes at least one and typically two cushion rings trapped by respective non-circular flanges.

U.S. Patent Application Publication No. 2002/0169044 discloses a sprocket with a hub and a plurality of teeth projecting radially outwardly from the hub. At least one cushion ring is located adjacent to the teeth, and the cushion ring defines a plurality of compression pads separated from each other by transverse grooves. Each of the compression pads is defined symmetrically about a circumferential mid-point. The cushion ring, when part of a sprocket with symmetric tooth spacings, is operable identically in first and second opposite rotational directions. In one arrangement, the compression pads each include a planar outer surface having a leading and a trailing end, where the leading end and trailing end are located a common radial distance from the center of the hub about which the sprocket rotates. The tooth spaces of the sprocket may be symmetric or asymmetric, and the root surface may be relieved. The sprocket may include multiple tooth profiles distributed randomly about the hub.

U.S. Pat. Nos. 6,179,741 and 6,371,875 disclose a roller chain sprocket with sprocket teeth each having an engaging flank and a disengaging flank. The engaging flank of a first tooth of the sprocket cooperates with the disengaging flank of a second tooth to define a tooth space having a root surface extending between the engaging flank and the disengaging flank. The root surface has a first root surface portion defined by a first radius extending from an arc center of the first root surface portion. A cushion ring is mounted to a first face of the sprocket and has a number of alternating compression pads and grooves. A first groove has a first groove portion defined by a second radius extending from an arc center of the first groove portion. The arc center of the first groove portion is positioned at least proximate to a radial line extending between a center of the sprocket and the arc center of the first root surface portion. A first compression pad has an inclined outer surface defined by a leading edge that is spaced radially inward relative to a trailing edge. The leading edge is also positioned radially inward from the engaging flank of the first tooth, and the trailing edge is positioned radially inward from a disengaging flank of the first tooth.

As can be seen, the above listed prior art sprocket tooth angular spacing is repetitive and is equal to 360 degrees divided by the number of sprocket teeth. Repetitive sprocket tooth spacing is known to create undesirable chain engagement noise having orders that are related to the number of sprocket teeth. A random tooth sprocket has both irregular angular spacing and varying pitch radii of the sprocket teeth which disrupts the repetitive chain engagement noise orders.

SUMMARY OF THE INVENTION

A sprocket includes a plurality of teeth spaced about its periphery, roots located between pairs of adjacent teeth, and a cushion ring contacted by a chain engaging the sprocket teeth. The roots have root radii defined as the distance between the center of sprocket and the point along the root closest to the sprocket center in the radial direction. In some embodiments, the roots have three distinct radii. The cushioning material of the cushion ring receives the impact while engaging the chain. In some embodiments, the cushion ring has a contour substantially following the contours of the sprocket teeth geometry. In some embodiments, the cushion ring has a randomized geometry to provide predetermined cushioning that varies from tooth to tooth around the sprocket.

In some embodiments, the sprocket includes a contoured elastomer cushion ring of an elastomer material affixed onto each side of the random tooth roller chain sprocket. In some embodiments, the sprocket includes a contoured elastomer cushion ring having at least one cushion ring contour, each contour having a predetermined amount of interference with the roller chain pin links and bush links. The different cushion ring geometries each change the amount of interference with the chain for each incremental rotation of the sprocket. Full interference occurs at full chain engagement. The interference may occur abruptly or gradually during chain engagement. This is preferably used for tuning the noise-vibration-harshness (NVH) levels while minimizing negative effects. Negative effects include durability concerns, such as tearing of the cushioning material, from too large an interference or applying the interference too abruptly. The elastomer material reduces chain roller or bushing engagement impact forces, thereby reducing noise and increasing roller/bushing fatigue life.

Accordingly, a sprocket of the present invention includes a plurality of teeth spaced about its periphery with roots located between pairs of adjacent teeth. The sprocket further includes a cushion ring including a cushioning material for receiving the impact while engaging a chain. Each root has a root radius defined as the distance between the center of the sprocket and the point along the root closest to the sprocket center in the radial direction. In some embodiments, at least one of the roots has a first root radius, and at least one of the roots has a second root radius, the second root radius being greater than the first root radius. The first root radius and the second root radius are defined so that the distance between the centers of adjacent rollers are substantially equal along the rollers seated in the sprocket roots. In other embodiments, the tooth spacings are all equal and the root radii are all equal. In some embodiments, the cushion ring has a contour substantially following the contours of the sprocket teeth geometry. In other embodiments, the cushion ring has a randomized geometry to provide predetermined cushioning that varies from tooth to tooth around the sprocket.

In some embodiments, the sprocket for a roller chain includes a plurality of rollers connected by links. The sprocket includes a chain driving body. A plurality of teeth are spaced about a periphery of the body, with roots located between pairs of adjacent teeth, each root serving as a seat for a roller of a link engaged with the sprocket. The sprocket further includes a cushion ring affixed onto the chain-driving body for receiving an impact of the links of the roller chain driven by the body. The cushion ring has a plurality of contoured edges, each contoured edge corresponding to one of the seats, the contoured edges being arranged in a random sequence around the sprocket.

DETAILED DESCRIPTION OF THE INVENTION

Figure 1:
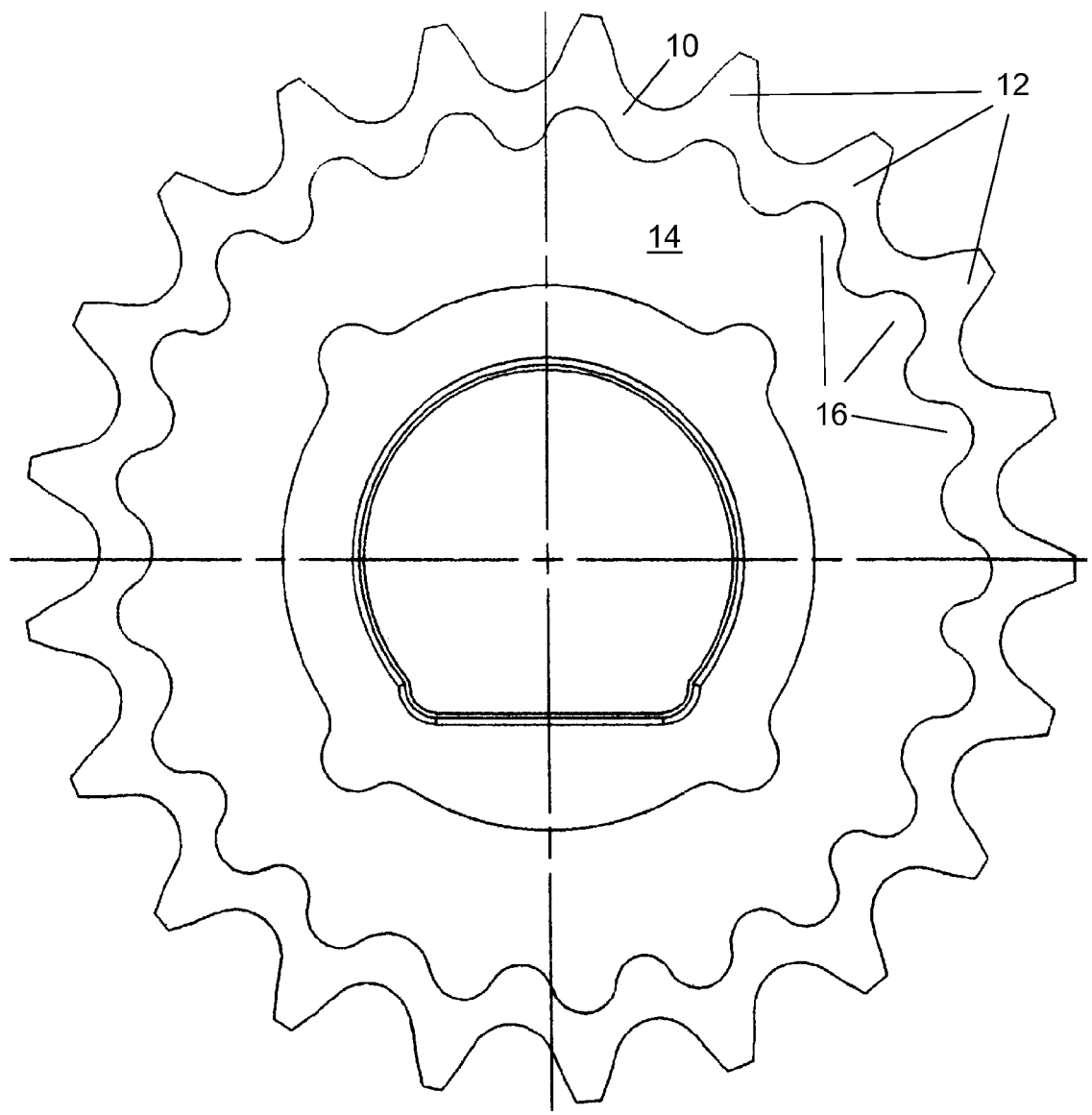
FIG. 1 shows a side view of a random tooth sprocket including a contoured elastomer cushion ring with a first geometry in an embodiment of the present invention.
Figure 2:
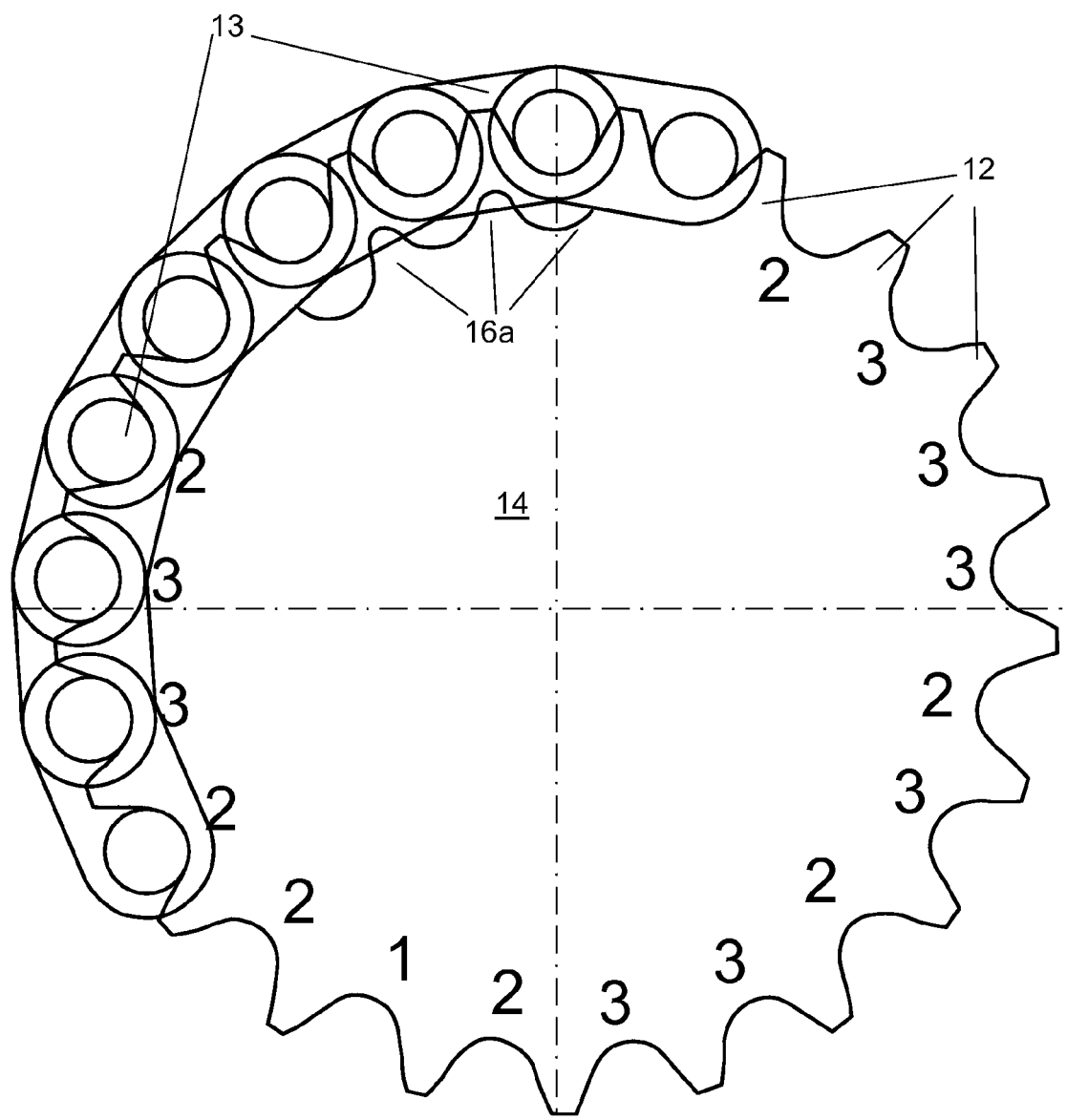
FIG. 2 shows a sprocket with a second cushion ring geometry in an embodiment of the present invention.
Figure 3:
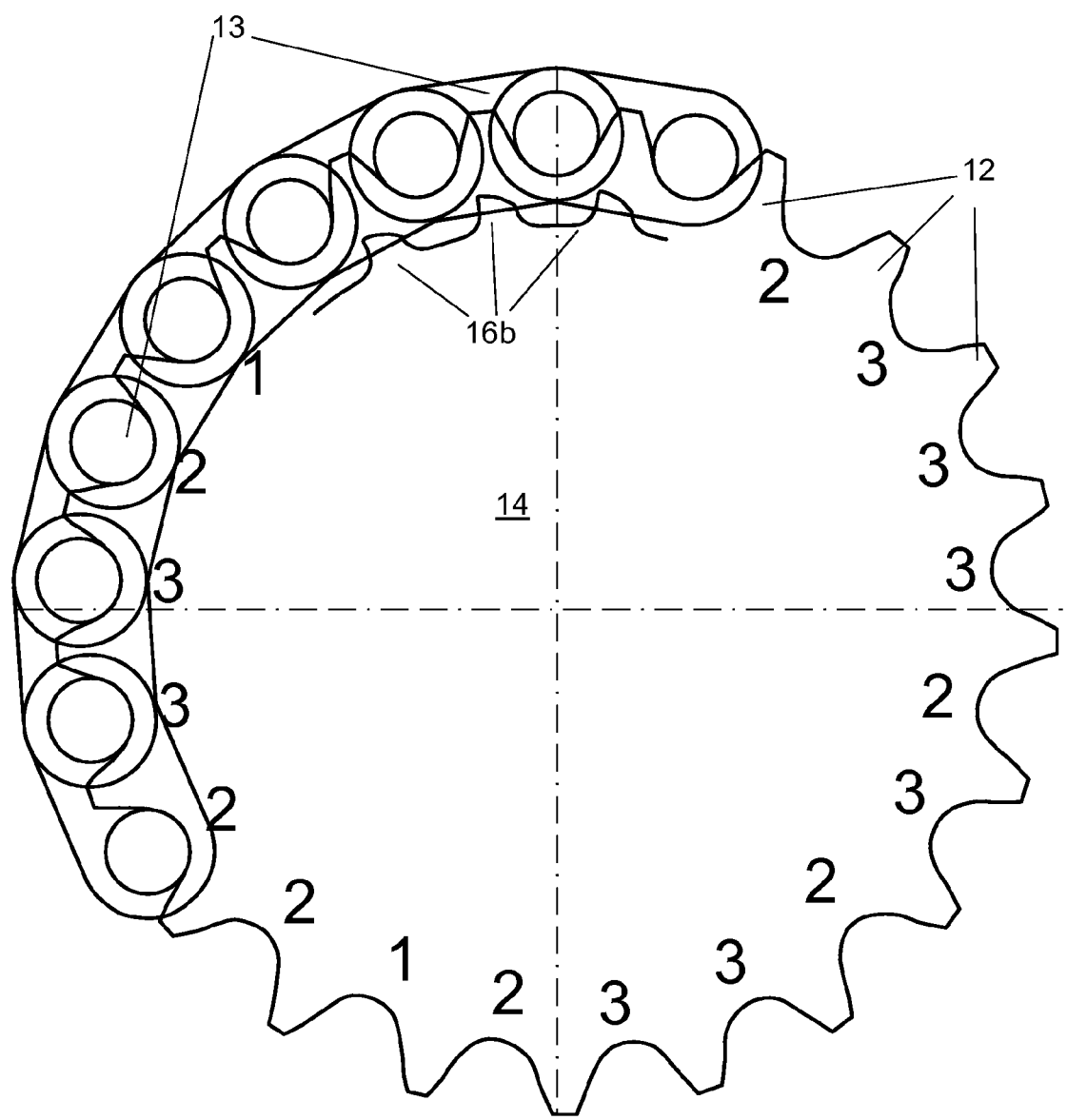
FIG. 3 shows a sprocket with a third cushion ring geometry in an embodiment of the present invention.
Figure 4:
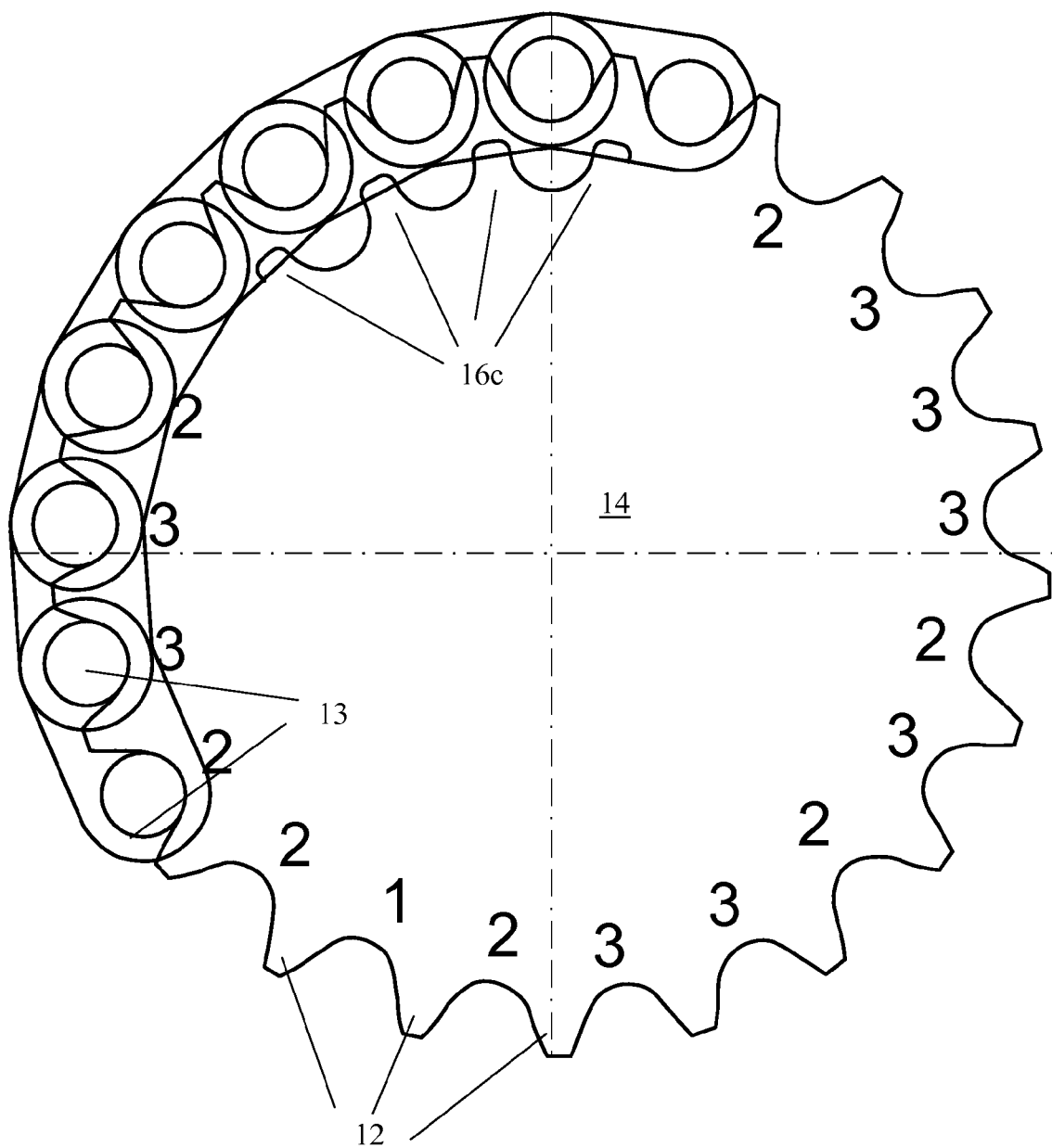
FIG. 4 shows a sprocket with a fourth cushion ring geometry in an embodiment of the present invention.
Figure 5:
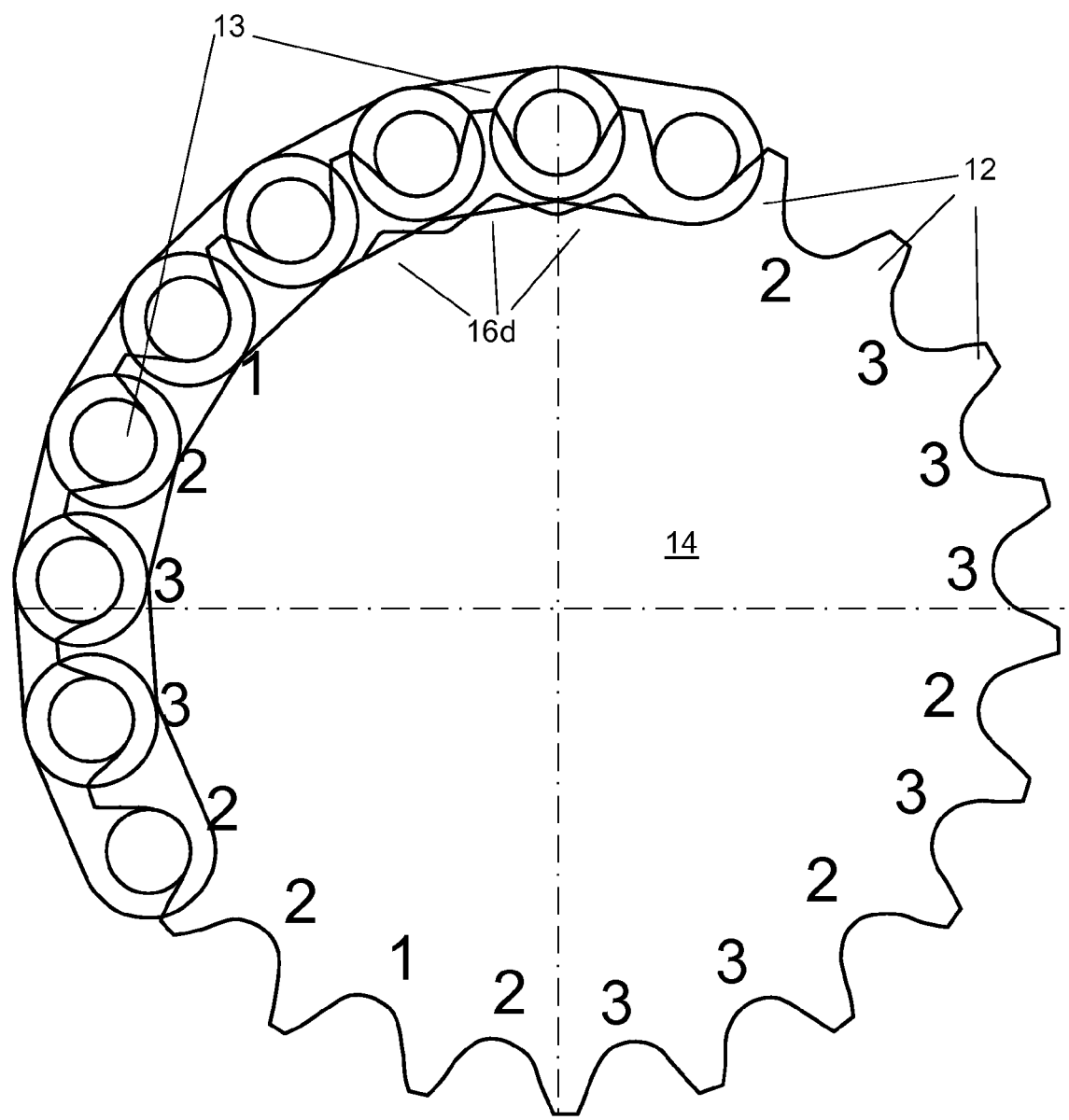
FIG. 5 shows a sprocket with a fifth cushion ring geometry in an embodiment of the present invention.
Figure 6:
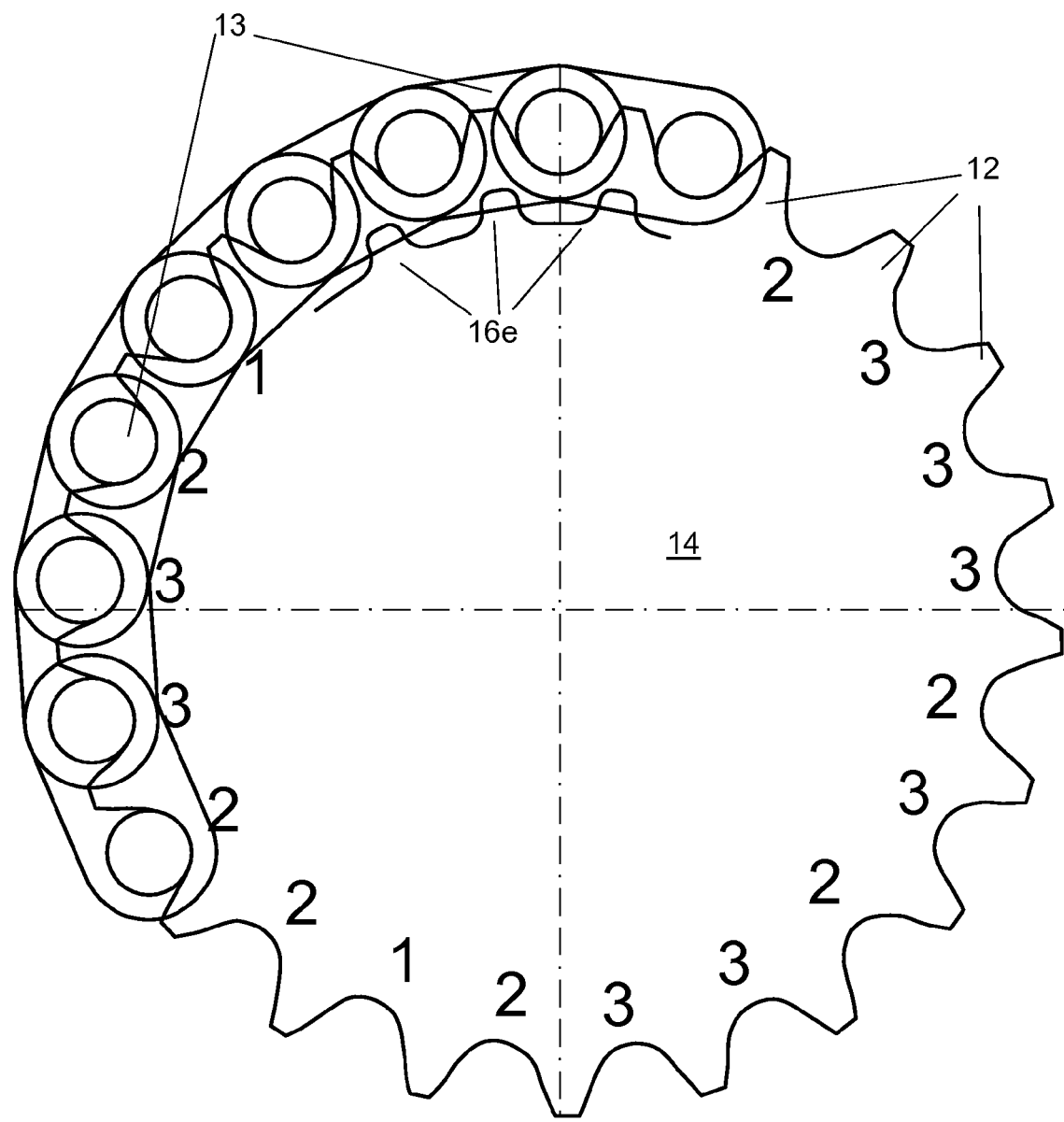
FIG. 6 shows a sprocket with a sixth cushion ring geometry in an embodiment of the present invention.
Figure 7:
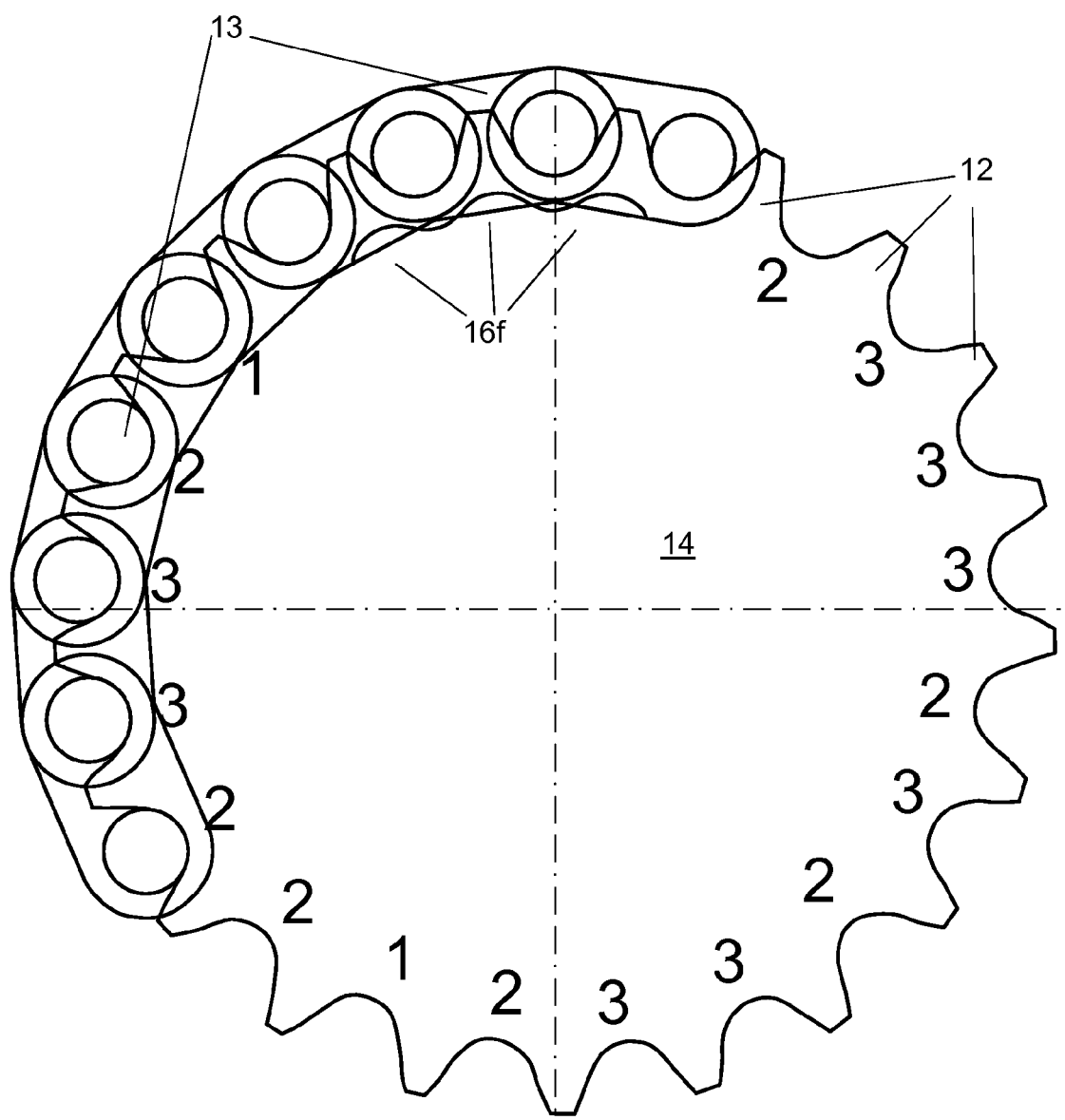
FIG. 7 shows a sprocket with a seventh cushion ring geometry in an embodiment of the present invention.
Figure 8:
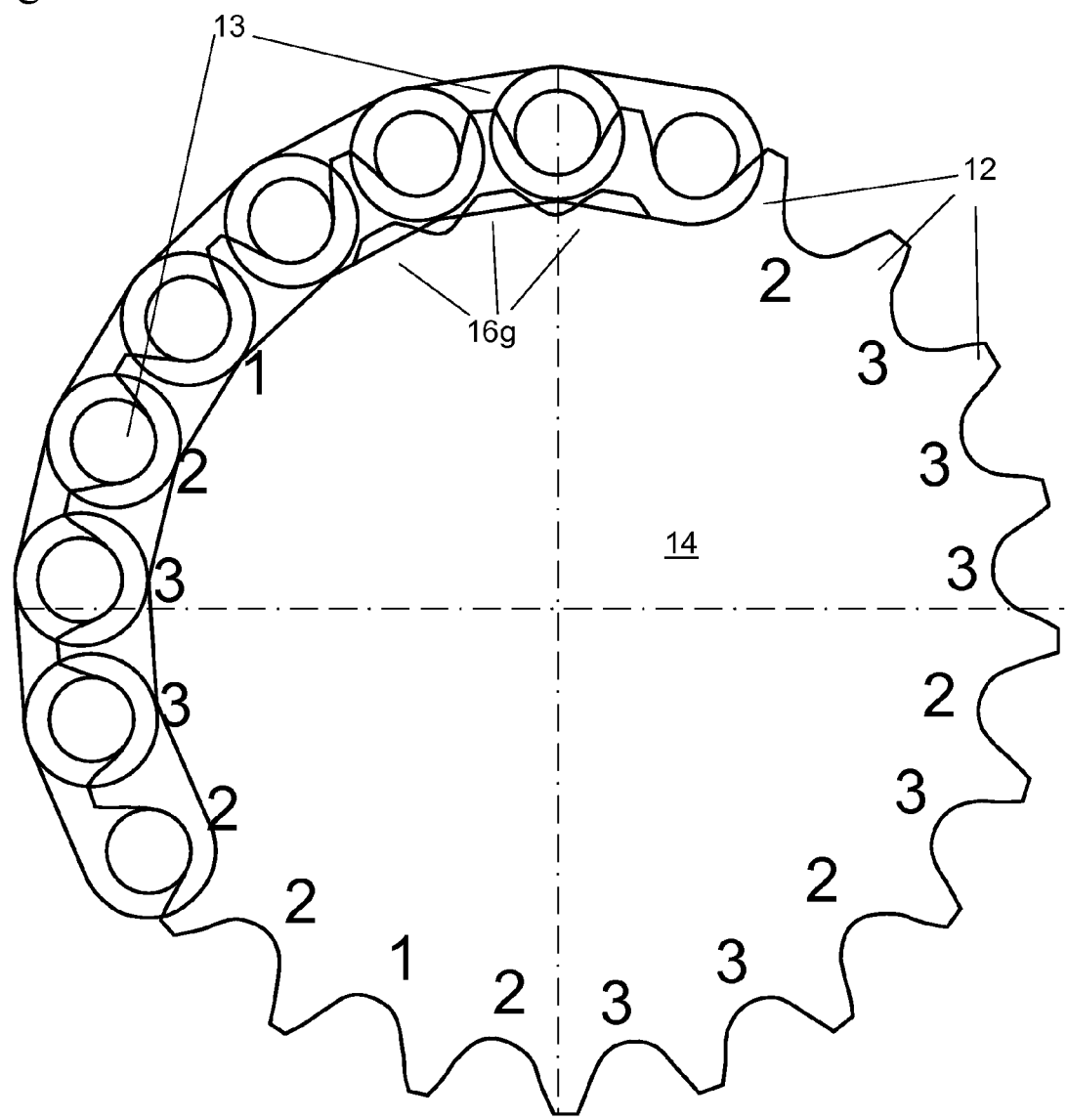
FIG. 8 shows a sprocket with an eighth cushion ring geometry in an embodiment of the present invention.

In a first set of embodiments, the sprocket is a random tooth sprocket including a cushion ring with a contour substantially following the contours of the sprocket teeth geometry. Referring to FIG. 1, the random tooth sprocket 10 includes a set of teeth 12 circumferentially distributed upon its circumference. The random tooth sprocket 10 is preferably used in conjunction with a roller chain 13, as shown in FIGS. 2-8. The random tooth sprockets of FIGS. 1-8 are described herein for clockwise rotation of the sprockets during use, but the geometries of FIGS. 1-8 may also be used with counterclockwise rotation within the spirit of the present invention. The random tooth sprocket 10 includes a plurality of roots with a first root radius and a plurality of roots with a second root radius greater than the first root radius. In the embodiments of FIGS. 1-9, the roots with the first root radius are randomly arranged with the roots with the second root radius in a predetermined pattern about the random tooth sprocket 10 periphery. By randomly arranged, it is meant that the pattern is staggered between first and second radii, and not a pure alternating pattern between first and second radii. A random tooth sprocket is described in more detail in U.S. Pat. No. 6,155,943, which is hereby incorporated herein by reference. A random sprocket comprises two or more radii for locating the tooth roots. Preferably, three tooth roots are used, as denoted by the numbers 1, 2, and 3 in FIGS. 2-8.

As the rollers of the roller chain 13 move from seat to seat between the set of teeth 12, the radial position at which the rollers seat varies from a maximum radius to a nominal radius to a minimum radius. The angular displacement of the sprocket is the angular distance between the center of the roller in one seat and the center of the roller in an adjacent seat. The angular displacement is effectively altered from seat to seat around the random tooth sprocket 10. The roller chain 13 includes chain pins and bush links.

The cushion material 14 of the cushion ring is affixed, preferably by bonding, onto at least one side of the random tooth sprocket 10. The contour of the cushion material 14 provides a predetermined amount of interference with the roller chain 13 pin links and bush links. The chain pin and bush links compress the elastomer material 14 during chain 13 engagement with the sprocket. The elastomer material 14 reduces the chain roller or bushing engagement impact forces, which reduces noise and increases the roller/bushing fatigue life. The cushion ring includes an elastomeric material, which may include, but is not limited to, various heat-resistant and oil-resistant non-halogen synthetic rubbers, hydrogenated nitrile butadiene rubber (HNBR), partially or completely hydrogenated acrylonitrile-butadiene rubber, or polyacrylate (ACM).

The elastomer material 14 of the cushion ring has a contoured edge or circumference 16. The geometry of the contoured edge 16 follows the irregular geometry of the random sprocket teeth 12 such that each chain 13 engagement has a predetermined amount of fully engaged chain interference with the chain pin links and bush links. The contoured edge 16 is preferably designed to provide a substantially equivalent chain interference at each seating of the chain. The geometry of the contoured edge 16 is also preferably designed to vary the rate of chain interference as the chain enters and exits engagement with the sprocket 10. Therefore, contoured edge 16 may have various geometric shapes or contours. For example, see respectively the first contoured edge 16 of FIG. 1, the second contoured edge 16a of FIG. 2, the third contoured edge 16b of FIG. 3, the fourth contoured edge 16c of FIG. 4, the fifth contoured edge 16d of FIG. 5, the sixth contoured edge 16e of FIG. 6, the seventh contoured edge 16f of FIG. 7, and the eighth contoured edge 16g of FIG. 8. The various shapes of the contoured edge 16 are preferably used to tune the sprocket and chain engagement system. Tuning may be necessary to achieve improvement or optimization of noise-vibration-harshness (NVH) levels and at the same time to minimize any negative effects such as increased chain load or elastomer material 14 durability or compression set from chain 13 engagement forces necessary to compress the cushion ring. A clearance relief contour is preferably positioned adjacent to each interference geometry. Each adjacent clearance relief provides a space to accept the deflected cushion ring material 14 especially the contoured edge 16 portion. The geometry and amount of contoured edge 16 interference as well as the geometry and amount of contoured edge 16 clearance relief may be altered to achieve optimum system performance. As can be seen in FIGS. 1-9, the various cushion ring geometries affect the rate of interference as the chain comes into and out of sprocket engagement as well as the total interference with a fully engaged chain. The contoured cushioning material edge 16-16g preferably has uneven edges circumferentially following the first radii, the second radii, and the third radii of the random sprocket.

Figure 9:
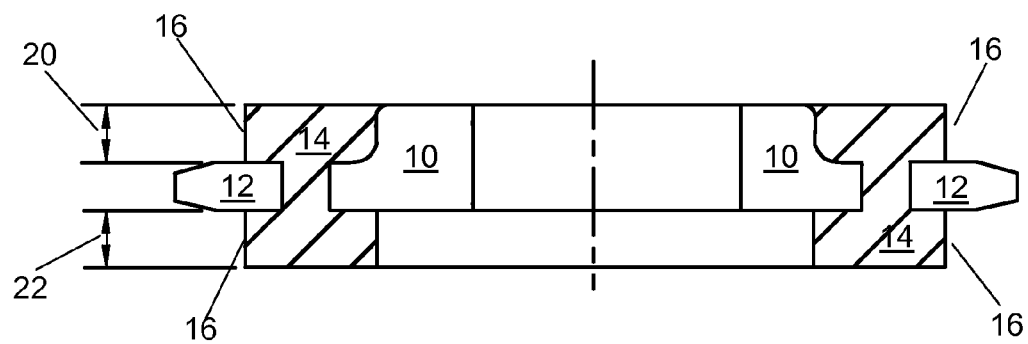
FIG. 9 shows a cross sectional view of a sprocket in an embodiment of the present invention.

The contoured edge 16 as shown in cross section in FIG. 9 may have a first thickness 20 and a second thickness 22 different from the first thickness on opposite side of the random tooth sprocket 10. The first thickness 20 and the second thickness 22 are preferably wide enough to allow sufficient contact of the chain 13 bush link plates and pin link plates within the permissible side to side movement of the chain 13 on the sprocket 10. A set of holes in a flange of the random tooth sprocket 10 may be provided for the cushioning material 14 to pass through random tooth sprocket 10.

At least two radii are provided for the random tooth sprocket 10. A third radius may also be provided. As shown in FIGS. 2-8, one relationship between the three radii is that radius 3 is greater in length than radius 2 and radius 2 is greater in length than radius 1. The geometry of the random tooth sprocket 10 preferably substantially follows the relationship between the three radii to provide predetermined substantially equivalent amounts of chain interference and cushioning at each roller seating.

It should be noted that the pitch distance or chordal length between seated rollers preferably remains constant around the sprocket. Maintaining a constant chordal length reduces the impact load of the rollers against the teeth. The variation in the seating position from tooth to tooth results in a modulation of the timing of successive impacts. This modulation reduces the pitch frequency of the noise produced by the chain drive.

The design of the sprockets of FIGS. 1-9 is preferably directed to maintaining the engagement or seating of the roller with the root of the sprocket 10, but the radial position of the root varies irregularly from tooth to tooth around the sprocket 10. Preferably, the pattern does not contain any abrupt transitions from the upper seating positions to the lower seating positions, or vice versa, without passing through the nominal seating position for at least one tooth. The avoidance of abrupt transitions contributes to the smooth running of the chain 13 and reduce the generation of mechanical noise and reduce wear on the rollers.

In order to generate the profile of the sprocket 10 of the present invention, the location of the seating radius of each root, or the space between sprocket teeth 12 in which the rollers seat, is first determined. While locating the seating position of each roller, the pitch distance between seated rollers is kept constant.

The elastomer material 14 may be bonded to each side of the random tooth sprocket 10. The cushion ring contour 16 has a predetermined amount of interference with the roller chain pin links and bush links. The chain pin and bush links compress the elastomer material 14 especially the ring contour edge 16 portion during chain 13 engagement to the sprocket 10. The elastomer material 14 reduces chain roller or bushing engagement impact forces, which reduces noise and increases roller/bushing fatigue life.

The random sprocket 10 of the embodiments of FIGS. 1-9 is not limited to three different radii. A random sprocket such as sprocket 10 can have as few as two radii or a plurality of radii greater than three. A random tooth sprocket 10 has both irregular angular spacing and varying pitch radii of the sprocket teeth 12 which disrupts the repetitive chain engagement noise orders.

In some embodiments of the present invention, the sprocket is a conventional sprocket with a randomized cushion ring. The angular spacing of the teeth of a conventional sprocket is repetitive and is equal to 360 degrees divided by the number of sprocket teeth. Repetitive sprocket tooth spacing creates undesirable chain engagement noise orders that are related to the number of sprocket teeth. Conventional cushion rings do not change the repetitive chain engagement noise orders. In some embodiments of the present invention, elastomer cushion rings with random interference pads are bonded to each side of a conventional roller chain sprocket.

The elastomer material of random cushion rings of the present invention is preferably compressed unequally and non-repetitively during chain engagement to the sprocket. The cushion ring randomness modulates the angular position where each chain roller impacts a sprocket tooth and disrupts the repetitive chain engagement noise orders. This variation or randomization preferably provides a noise modulation effect. The compression of the elastomer material reduces chain roller or bushing engagement impact forces which, in turn, reduces noise and increases roller/bushing fatigue life. Random cushion rings of the present invention may have compression pads of irregular geometry, angular positioning, radial positioning, or chain interference. The cushion ring randomness modulates the angular position where each chain roller impacts a sprocket tooth and disrupts the repetitive chain engagement noise orders.

A clearance relief geometry is preferably positioned adjacent to each interference geometry. Each adjacent clearance relief provides a space to accept the deflected cushion ring material. In at least some embodiments the cushion ring material is deflected into both the clearance relief space immediately before and the clearance relief space immediately after the compression pad. The geometry, angular position, radial position, and amount of the cushion ring interference as well as the geometry, angular position, radial position, and amount of cushion ring clearance relief may be altered to tune the sprocket and chain engagement system. Tuning may be necessary to achieve optimum NVH improvement and at the same time minimize any negative effects from engagement forces necessary to compress the cushion ring. The sprockets of FIGS. 10 and 11 are described herein for clockwise rotation of the sprockets during use, but the geometries of FIGS. 10 and 11 may also be used with counterclockwise rotation within the spirit of the present invention.

Figure 10:
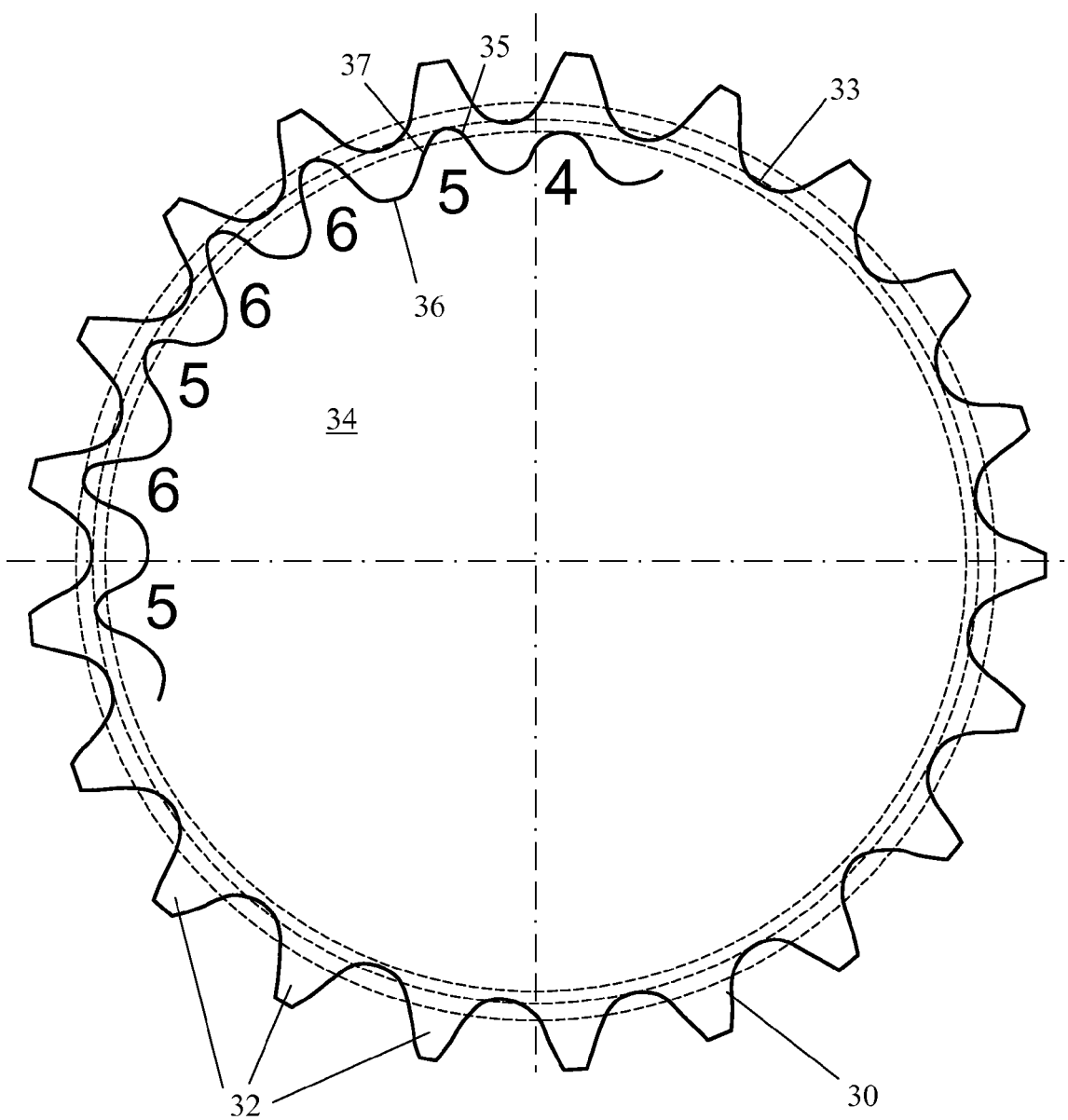
FIG. 10 shows a side view of a sprocket including a cushion ring with interference pads located at random radial positions in an embodiment of the present invention.

FIG. 10 shows a side view of a sprocket 30 including a random cushion ring 34, where the interference pads 35 are located in a random sequence of three radial positions 4, 5, and 6 with respect to the center of the sprocket. The radial distances are indicated as dashed lines in FIG. 10. The sprocket 30 includes a plurality of teeth 32, which are equally shaped and equally spaced around the perimeter of the sprocket. A roller seat 33 is located between each pair of adjacent teeth of the sprocket. The contoured edge 37 of the cushion ring is formed to provide a compression pad 35 with a clearance relief geometry 36 for each roller seat. Preferably, the pattern does not contain any abrupt transitions from the upper radial positions 6 to the lower radial positions 4, or vice versa, without passing through the intermediate radial position for at least one tooth. Although the interference pads are shown at three radial positions in FIG. 10, two radial positions or more than three radial positions may be used in the random sequence within the spirit of the present invention.

Figure 11:
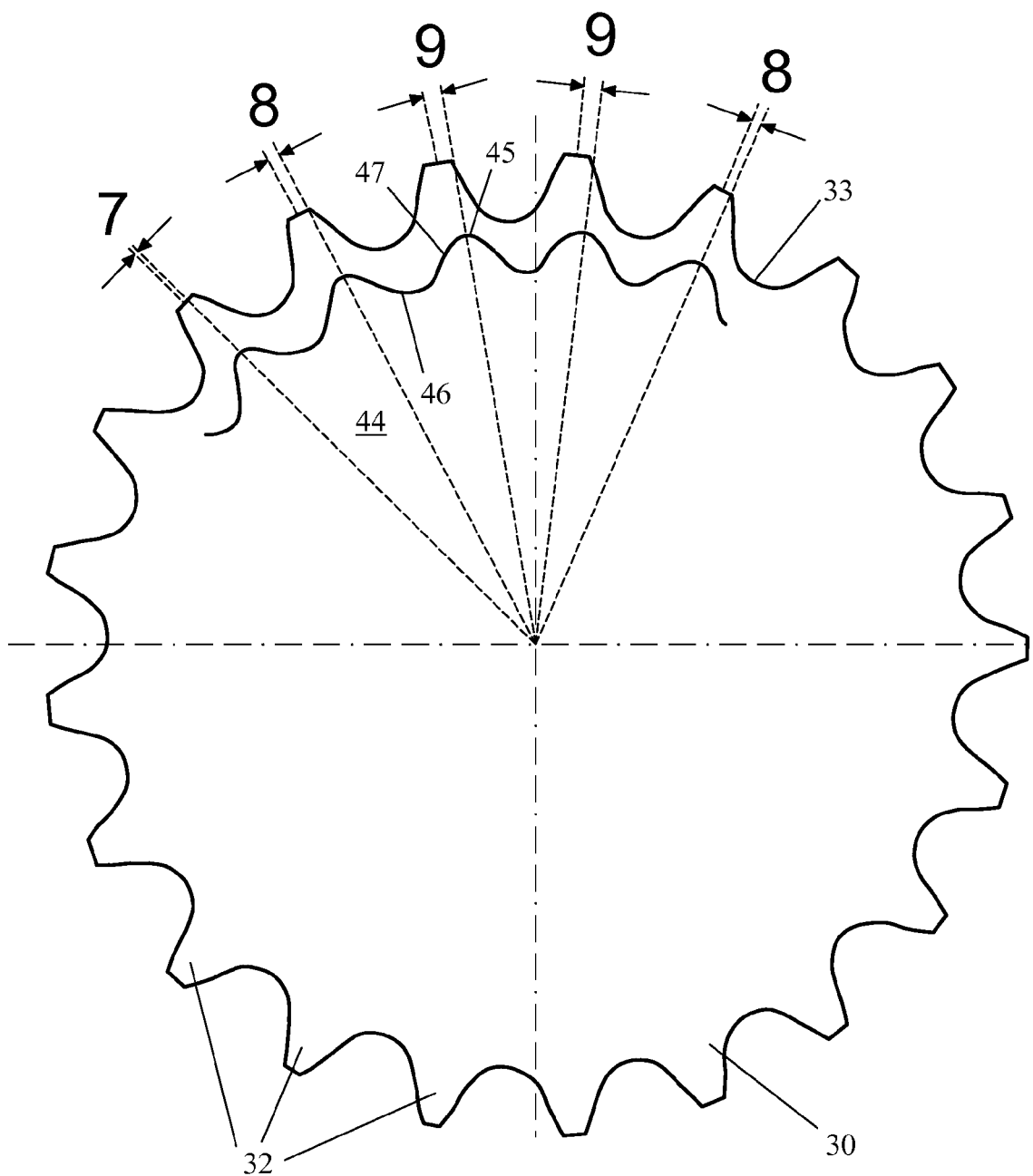
FIG. 11 shows a side view of a sprocket including a cushion ring with interference pads located at random angular positions in an embodiment of the present invention.

FIG. 11 shows a side view of a sprocket 30 including a random cushion ring 44, where the interference pads 45 are located in a random sequence of three angular positions 7, 8, and 9 with respect to the center of the sprocket. In FIG. 11, the angular positions are indicated as rotations from alignment of the center of the sprocket tooth and the center of the contoured edge at the tooth, and for each angular position the center of the contoured edge is rotated clockwise with respect to the center of the tooth. In other embodiments, the angular positions may include the center of a contoured edge aligned with the center of a sprocket tooth and/or one, more than one, or all centers of contoured edges rotated counterclockwise with respect to the center of the sprocket tooth within the spirit of the present invention. The sprocket 30 includes a plurality of teeth 32, which are equally shaped and equally spaced around the perimeter of the sprocket. A roller seat 33 is located between each pair of adjacent teeth of the sprocket. The contoured edge 47 of the cushion ring is formed to provide a compression pad 45 with a clearance relief geometry 46 for each roller seat. Preferably, the pattern does not contain any abrupt transitions from the maximum angular positions 9 to the minimum angular positions 7, or vice versa, without passing through the intermediate angular position for at least one tooth. Although the interference pads are shown at three angular positions in FIG. 11, two angular positions or more than three angular positions may be used in the random sequence within the spirit of the present invention.

In another embodiment of the present invention, the random cushion ring includes a random sequence of at least two contoured edges. The contoured edges may vary in the shape of the compression pad or the clearance relief geometry. The contoured edges preferably are selected from the geometries 16-16g shown in FIGS. 1-8.

Alternatively, a random cushion ring of the present invention may be used in combination with a random sprocket of the present invention. Finally, a random cushion ring may include a random sequence consisting of contoured edges of any combination of variations in geometry, angular position, and radial position within the spirit of the present invention.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A sprocket for a roller chain comprising a plurality of rollers connected by links, the sprocket comprising a chain-driving body comprising:
   a plurality of teeth spaced evenly about a periphery of the body and identically shaped, with roots located between pairs of adjacent teeth, each root serving as a seat for a roller of a link engaged with the sprocket; and
   a cushion ring affixed onto the chain-driving body for receiving an impact of the links of the roller chain driven by the body, the cushion ring having a plurality of contoured edges, each contoured edge corresponding to one of the seats, the plurality of contoured edges including at least a first contoured edge and a second contoured edge different from the first contoured edge, the contoured edges being arranged in a random sequence around the sprocket.

2. The sprocket of claim 1, wherein each contoured edge is selected to provide a predetermined amount of interference with the links.

3. The sprocket of claim 1, wherein the cushioning material portion is bonded to the chain-driving body.

4. The sprocket of claim 1, wherein each contoured edge is formed around a compression pad and includes a clearance relief geometry adjacent the compression pad.

5. The sprocket of claim 4, wherein the compression pads comprise an elastomeric material.

6. The sprocket of claim 1, wherein a difference between the first contoured edge and the second contoured edge is selected from the group consisting of:
   a) an angular positioning;
   b) a radial positioning;
   c) a contoured edge geometry;
   d) a clearance relief geometry; and
   e) any combination of a)-d).

* * * * *